United States Patent
Chao et al.

(10) Patent No.: US 8,329,614 B2
(45) Date of Patent: Dec. 11, 2012

(54) MERCURY ADSORBENTS COMPATIBLE AS CEMENT ADDITIVES

(75) Inventors: Chien-Chung Chao, Williamsville, NY (US); David R. Thompson, Grand Island, NY (US); Jurron Bradley, New York, NY (US); Steve J. Pontonio, Eden, NY (US)

(73) Assignee: Praxair Technology, Inc., Danbury, CT (US)

( * ) Notice: Subject to any disclaimer, the term of this patent is extended or adjusted under 35 U.S.C. 154(b) by 296 days.

(21) Appl. No.: 12/788,413

(22) Filed: May 27, 2010

(65) Prior Publication Data

US 2010/0234214 A1    Sep. 16, 2010

Related U.S. Application Data

(62) Division of application No. 11/945,323, filed on Nov. 27, 2007, now Pat. No. 7,767,007.

(60) Provisional application No. 60/873,929, filed on Dec. 8, 2006.

(51) Int. Cl.
   *B01D 53/64* (2006.01)
   *B01J 20/02* (2006.01)
   *B01J 20/32* (2006.01)

(52) U.S. Cl. ...................... 502/417; 502/439

(58) Field of Classification Search .............. 95/134; 96/153; 502/180–183, 416, 417, 419, 439; 423/210; 110/203, 345
See application file for complete search history.

(56) References Cited

U.S. PATENT DOCUMENTS

| | | | | |
|---|---|---|---|---|
| 6,136,749 A * | 10/2000 | Gadkaree et al. | | 502/183 |
| 6,395,145 B1 * | 5/2002 | Altman | | 204/164 |
| 6,706,111 B1 * | 3/2004 | Young | | 106/705 |
| 2004/0003716 A1 * | 1/2004 | Nelson, Jr. | | 95/134 |
| 2006/0048646 A1 * | 3/2006 | Olson et al. | | 95/134 |
| 2006/0204418 A1 * | 9/2006 | Chao et al. | | 423/210 |
| 2006/0204429 A1 * | 9/2006 | Bool et al. | | 423/449.1 |
| 2006/0204430 A1 * | 9/2006 | Bool et al. | | 423/449.1 |
| 2006/0205592 A1 * | 9/2006 | Chao et al. | | 502/417 |

FOREIGN PATENT DOCUMENTS

| EP | 1645323 A1 * | 4/2006 |
|---|---|---|
| WO | WO 2006/099290 A1 * | 9/2006 |
| WO | WO 2006/099291 A2 * | 9/2006 |

(Continued)

OTHER PUBLICATIONS

Zhou, Qunhui, "Evaluations of Concretes Containing Mercury Sorbents", Presented at the Combined Power Plant Air Pollutant Control Mega Symposium, Washington, D.C., Aug. 30-Sep. 2, 2004 (Updated).*

(Continued)

*Primary Examiner* — Frank Lawrence, Jr.
(74) *Attorney, Agent, or Firm* — Donald T. Black

(57) ABSTRACT

Solid adsorbents, following their use for mercury removal from flue gas, that do not interfere with the ability of air-entraining additives (such as surfactants) to form stable bubbles when added to fly ash containing the adsorbents. The interference is overcome by heating the materials used in the manufacture of the adsorbent so that magnesium hydroxide and/or one or more alkali compounds containing one or more silicate, aluminate, and/or phosphate moiety, added or already present in the materials, binds multivalent cations present in the materials that could otherwise interfere with the surfactant activity.

45 Claims, 1 Drawing Sheet

FOREIGN PATENT DOCUMENTS

WO    WO 2007/149867 A1 * 12/2007
WO    WO 2008/064360 A2 * 5/2008

OTHER PUBLICATIONS

Baltrus, John P., "The Role of Unburned Carbons in AEA Adsorption as Measured by FOam Index and UV-Vis Methods". (no date given).*

Gao, Yu-Ming, "Effects of Carbon and Air Entrainment in Fly Ash Concrete: The Role of Soot and Carbon Black", Energy & Fuels 1997, 11, 457-462.*

Anonymous: "The Foam Index Test: A Rapid Indicator of Relative AEA Demand"; Technical Bulletin TB-0202, [Online] XP002482456; Grace Construction Products. (no date given).*

* cited by examiner

MERCURY ADSORBENTS COMPATIBLE AS CEMENT ADDITIVES

RELATED APPLICATIONS

This application is a divisional of and claims priority from parent application Ser. No. 11/945,323, filed Nov. 27, 2007, which issued as U.S. Pat. No. 7,767,007 on Aug. 3, 2010, which parent application claims priority from U.S. provisional Application Ser. No. 60/873,929, filed Dec. 8, 2006, the disclosure of which is hereby incorporated herein by reference.

FIELD OF THE INVENTION

The present invention relates generally to improved catalytic adsorbents which are useful in the removal of mercury from flue gas streams. The adsorbents are improved in that their presence in fly ash that is recovered from flue gas following their use does not interfere with the usefulness of the fly ash as a cement additive. The present invention also relates to methods of manufacturing and using such catalytic adsorbents.

BACKGROUND OF THE INVENTION

The desirability of removing mercury from gaseous streams that might introduce the mercury into the atmosphere, such as from flue gases emitted in combustion operations, is increasingly well known.

Some attempts to remove mercury from flue gas employ solid adsorbents that are introduced into the flue gas stream. The mercury is removed from the flue gas atmosphere onto the adsorbent, and the mercury-bearing adsorbent is separated from the flue gas by the equipment which also separates other solid materials such as fly ash from the flue gas before the flue gas is emitted into the atmosphere.

Fly ash recovered from the flue gas of industrial combustion operations such as coal-fired electric power plants is often useful as a component of cement. It is desirable to be able to use fly ash in this way even when the fly ash contains solid adsorbents that were used as described above to remove mercury from the flue gas.

When a cement composition is combined with water and other components to create a mixture that can be poured or otherwise formed into what will become a solid product when the cement solidifies, a surfactant or other air-entraining additive is often added to the cement in order to permit bubbles to form within the cement mixture. The bubbles become voids within the solidified product so that any water that permeates into the solid product may expand into the voids if it freezes, so as not to jeopardize the integrity of the solid product itself.

However, it is well known that the presence with the fly ash of PAC (powder activated carbon) adsorbents used for mercury removal from flue gas can interfere with the ability to form the desired bubbles in the cement composition by air-entraining additive(s). Thus, there is a need to find solid adsorbents for mercury removal, and methods for making them, that overcome this interference.

BRIEF SUMMARY OF THE INVENTION

One aspect of the present invention is a catalytic adsorbent composition for removing mercury from a flue gas stream at elevated temperatures, which comprises an activated carbon having a halogen or halide compound dispersed thereon, such as a halide salt having a cation and an anion, and which after its use to adsorb mercury from flue gas at elevated temperature has a Foaming Index less than 45.

Another aspect of the present invention is methods of making the foregoing composition from carbonaceous feed material, halide salt and one or more compounds of formula Ia and/or Ib

wherein each occurrence of M, is silicon, aluminum or phosphorus, each occurrence of Alk, is sodium or potassium, and a, n and p are positive integers. The integers are chosen so that the compound of formula Ib has no net charge, based on the valence of any silicon atom present being (+4), the valence of any aluminum atom present being (+3), the valence of any phosphorus atom present being (+5), the valence of each oxygen atom present being (−2), and the valence of any sodium atom present and of any potassium atom present being (+1). Preferred examples of compounds according to formula Ib include sodium orthosilicate, sodium metasilicate, sodium aluminate, sodium aluminosilicate, sodium orthophosphate, and sodium metaphosphate, and mixtures of any of these.

In some methods, the components are combined with PAC adsorbent under conditions that form the composition having the desired adsorbent property, and the resulting adsorbent is then subjected to heating effective to homogenize the mixture and promote binding of multivalent cations (such as calcium ions) present in the adsorbent by the one or more compounds present of formula Ia and/or Ib. In other methods, the components necessary to form the desired adsorbent having a Foaming Index less than 45 are combined and the combination is then subjected to conditions, including the application of sufficient heat, to form a composition having the desired adsorbent property in which the heat has also formed carbonaceous materials into PAC and promoted binding of multivalent cations present in the adsorbent by the one or more compounds present of formula Ia and/or Ib. In yet other methods, the PAC adsorbent is prepared from carbonaceous material and halide salt, without addition of additional material of formula Ia and/or Ib, but with application of heat effective to promote binding of multivalent cations present in the adsorbent by one or more compounds present of formula Ia and/or Ib that are already present in the starting material.

The present invention provides catalytic adsorbents in which a halogen or halide compound, such as a halide salt, is dispersed on an adsorbent which contains activated carbon. The oxidation catalytic activity of the catalytic adsorbent promotes the formation of mercury halide while, at the same time, the adsorbent qualities of catalytic adsorbent retain the mercury halides thus formed. While the halide salts are stable and harmless at room temperature, these doped activated carbons are capable of forming mercury halogen compounds at elevated temperatures typical of those found in flue gas streams, and in the presence of reactive components typical of flue gas. These mercury halogen compounds are retained on the surface of the catalytic adsorbent. Moreover, the increased adsorbent capacity and faster rate of adsorption result in a need for smaller quantities of adsorbent relative to an undoped activated carbon formed from the same starting material.

A catalytic adsorbent composition according to this invention for removal of mercury from a flue gas stream thus includes (besides its low Foaming Index discussed herein) an activated carbon having a halogen or halide dispersed thereon. In the embodiments in which the halide is present as a halide salt, the cation of the halide salt can be an alkaline, alkaline earth, or transition metal (e.g., Na, Ca, Mg, Cu and K) and the anion involved can be bromide or chloride. Particularly preferred halide salts include, but are not limited to, NaCl, $CaCl_2$, $CuCl_2$, $CuBr_2$, NaBr, KBr, $CaBr_2$ and $MgBr_2$.

The halide salt is inert with respect to mercury and the activated carbon at room temperature. At elevated temperatures (e.g., 200°-570° F.) and in the presence of typical flue gas compositions, mercury halogen compounds are formed and retained by the adsorbent. While not intending to be bound by any theory, it is believed that any or all of the following or a combination of the following may occur. An oxidant (for example, oxygen form the flue gas or oxidant on the activated carbon) oxidizes the mercury and the anion of the dopant provides a counter ion for the mercury ion as oxidized by the oxidant. Alternatively or in addition, the oxidant oxidizes the anion in the salt and the oxidized anion in turn oxidizes the mercury to form a mercury halogen compound on the activated carbon. In addition or in the alternative, acidic gases present in the flue gas react with the dopant salt to yield a hydrogen halide. The hydrogen halide is then oxidized by an oxidant and yields a halogen species. The halogen species then reacts with the mercury to form a mercury halogen compound that is then adsorbed by the adsorbent.

The desired low Foaming Index that the adsorbent of the present invention also exhibits after it is used to adsorb mercury from flue gas is believed to be due to the heat-promoted dispersion of compounds of formula Ia and/or Ib and binding of multivalent cations, principally calcium, by the one or more compounds of formula Ia and/or Ib above.

The present invention also provides methods of manufacturing such doped activated carbon adsorbents, which after use exhibit the desired Foaming Index less than 45, that are both economical and safe. The catalytic adsorbents of the present invention can be made from a variety of methods, all of which include at some point the application of sufficient heat effective to promote the dispersion of compounds of formula Ia and/or Ib and binding of multivalent cations in the adsorbent by the aforementioned one or more compounds of formula Ia and/or Ib.

Thus, in one embodiment, the catalytic adsorbents can be formed by placing an activated carbon in an aqueous solution containing a halide salt and containing one or more compounds of formula Ia and/or Ib to form a mixture, stirring the mixture until a homogeneous slurry is formed and drying the activated carbon such that water from the aqueous solution evaporates and the halide salt and the one or more compounds of formula Ia and/or Ib present is dispersed on the surface of the activated carbon. The resulting product is then heated to promote binding of multivalent cations present in the adsorbent by the one or more compounds of formula Ia and/or Ib present.

In another exemplary method of manufacture, the catalytic adsorbents can be made by feeding a presoaked and dried mixture of carbonaceous feedstock, halide salt, and one or more compounds of formula Ia and/or Ib, or a dry mixture of halide salt, one or more compounds of formula Ia and/or Ib, and carbonaceous feedstock, into a reaction chamber together with an activating gas stream. When a mixture (presoaked and dried, or dry) of halide salt one or more compounds of formula Ia and/or Ib, and carbonaceous feedstock is used, the activating gas stream may contain air and/or steam, $O_2$, $CO_2$, $N_2$, CO or mixtures thereof. The carbonaceous feedstock, halide salt, one or more compounds of formula Ia and/or Ib, and the activating gases are subjected in the reaction chamber to conditions and for a residence time sufficient to form a powder activated carbon having halide salt dispersed on the surface of the powder activated carbon, and wherein binding occurs of the multivalent cations in the material by one or more compounds of formula Ia and/or Ib. In this method, the reaction chamber can be a batch type reactor such as a tube furnace, a mixing chamber or a reactor designed for continuous mode operation (e.g., a fluidized bed reactor, a burner or the like). The halide compound is preferably a salt of a cation selected from the group including an alkaline metal, an alkaline earth metal, and a transition metal (e.g, Na, K, Mg, Ca and Cu) and an anion selected from bromide and chloride. In some embodiments, the salt may be selected from the group including: NaCl, KCl, $CaCl_2$, $CuCl_2$, $CuBr_2$, NaBr, KBr, $CaBr_2$ and $MgBr_2$.

In this embodiment, the mixture of carbonaceous material, halide compound, and one or more compounds of formula Ia and/or Ib can be obtained by soaking the carbonaceous material with a salt solution that contains the one or more compounds of formula Ia and/or Ib, or by dry mixing. These two methods are similar except the manner in which the dopants are introduced. Doping by dry mixing may be desirable because it can reduce the processing cost. The degree of effectiveness of dry doping was unexpected given that mixing for doping is desirable at molecular levels and given that carbonaceous material and salt particles are typically in the micron size range (i.e. many orders of magnitudes above the molecular level).

In other embodiments, the powder activated carbon or other carbonaceous material is contacted with the halogen $X_2$ or hydrohalide HX, wherein X is Br, Cl or I. The contact is carried out at a temperature and for a time sufficient for X as the halogen or halide to attach to the surface of the carbonaceous material (whether by covalent bonding, physical adsorption, or otherwise).

The catalytic adsorbents of the present invention are suitable for use in the removal of mercury from a gas stream containing an oxidant and/or acidic gases at an elevated temperature such as a flue gas stream exiting a boiler or combustion process. In this process, the catalytic adsorbents of the present invention are injected into the flue gas stream for an in-flight mode of mercury capture. As discussed above, the halide salt dopant is inert with respect to the mercury at room temperature. At flue gas temperatures and in the presence of the activated carbon, oxidant and/or acidic gases, however, the halide salt dopant effectively removes mercury from the flue gas stream. The mercury is retained on the activated carbon in the form of mercury halogen compounds and can be separated from the flue gas stream together with the fly ash.

The mixture of fly ash and adsorbent that is recovered from the flue gas stream is useful as an ingredient of cement, and (compared to fly ash containing the adsorbents in which the binding of multivalent cations as described herein has not been promoted) exhibits greatly reduced interference with the surfactancy (ability to form and maintain bubbles) of air-entraining additives that are added to the cement composition.

Conditions to burn coal to produce power and the conditions to activate carbonaceous feedstock to manufacture activated carbon are substantially different. For example, the temperature of a boiler in a combustion chamber is very high and there is sufficient oxygen to oxidize all carbon that is present. Halide salts can therefore be oxidized and undergo complex reactions to yield hydrogen halides. In contrast, the temperature range during carbon activation is about 1200°-2000° F., much lower than the boiler temperature. The small amounts of oxidant are rapidly consumed and the surfaces of the carbon remain reductive. Thus, halide salts can pass through the activation process intact. Doping of activated carbons can therefore be accomplished by doping coal. Given that halide salts in flue gas on activated carbon at about 270° F. are reactive to mercury, it was surprising to discover that an activating gas containing oxidant can leave halide salts intact during the activation process.

DEFINITION OF TERM

The terms "bind" and "binding" used herein encompass any mechanism by which the application of heat to a mercury adsorbent composition that contains one or more compounds of formulas Ia and/or Ib reduces or prevents the ability of multivalent cations in the composition to interfere with the ability of air-entraining additive (surfactant) to promote formation of bubbles when air-entraining additive is mixed in water with fly ash that contains the adsorbent composition following its use to remove mercury from flue gas. One such mechanism is reaction of the compound of formula Ia and/or Ib to form compounds wherein (Alk) is replaced by the multivalent cation. Another such mechanism is formation of physical barrier such as a fused glassy layer which prevents the multivalent cation from reacting with the air-entraining additive (especially with the anionic moiety of an anionic surfactant).

The term Foaming Index ("FI") used herein is the quantity of surfactant required to create a sustained layer of foam. A lower number indicates greater compatibility with the surfactancy of air-entraining additives or other surfactants. As used herein, the Foaming Index of a material is determined by the following procedure:

Two grams of fly ash (as obtained from flue gas produced by combustion of coal, containing essentially no unburned carbon) is placed in a 70 ml cylindrical weighing bottle with inside dimensions of 40 mm×80 mm along with 25 cc of distilled water. The sample is ultrasonically dispersed for 5 minutes, after which time 8 gm of Portland cement is added. The weighing bottle is then capped and thoroughly shaken for 1 minute to completely wet the fly ash and cement.

The test solution is prepared from Darex II which is a commercially available air-entraining surfactant additive product (sold by W.R. Grace) that is an alkaline solution of sodium and potassium salts of complex organic acids. Water is added to the commercial product to form a diluted composition in which the concentration of the commercial product is 10 volume %. This diluted composition is the test solution.

The test solution is added dropwise from a 2 cc microburet. After each addition of a few drops, the bottle is capped and shaken vigorously for 15 seconds, after which time the cap is removed and the liquid surface is inspected. Prior to the end point of the test, any foam that has formed on the liquid surface is extremely unstable, and contains bubbles which burst within a few seconds. When the endpoint is reached, a layer of foam will be maintained on the surface for at least 45 seconds. The volume (in ml) of test solution required to produce this stable foam is the Foaming Index of the fly ash/cement mixture.

Portland cement commercially available from Quikrete, commercial grade type I/II, and fly ash from Pleasant Prairie Power Plant, Wisconsin ("P4") were used. P4 has been selling its fly ash for concrete application for many years. This fly ash is compatible with air-entraining additives used for concrete and has a low Foaming Index.

Carrying out this test procedure on 8 gm of the cement without additives yields the Foaming Index of the cement. The difference between the Foaming Index of the mixture of fly ash (containing adsorbent) and cement, and the Foaming Index of the cement, yields the Foaming Index of the fly ash (containing no adsorbent).

Carrying out this test procedure on 8 gm of cement with 1.98 gm of fly ash and 0.02 gm of powder activated carbon (PAC) adsorbent yields the Foaming Index of fly ash with a 1 wt. % adsorbent/cement mixture. Since addition of 1 wt. % adsorbent in fly ash is a reasonable target dosage for effective mercury removal, this Foaming Index value is used herein to characterize the adsorbent's compatibility with the surfactancy of air-entraining additives.

DETAILED DESCRIPTION OF THE INVENTION

Figure 1:
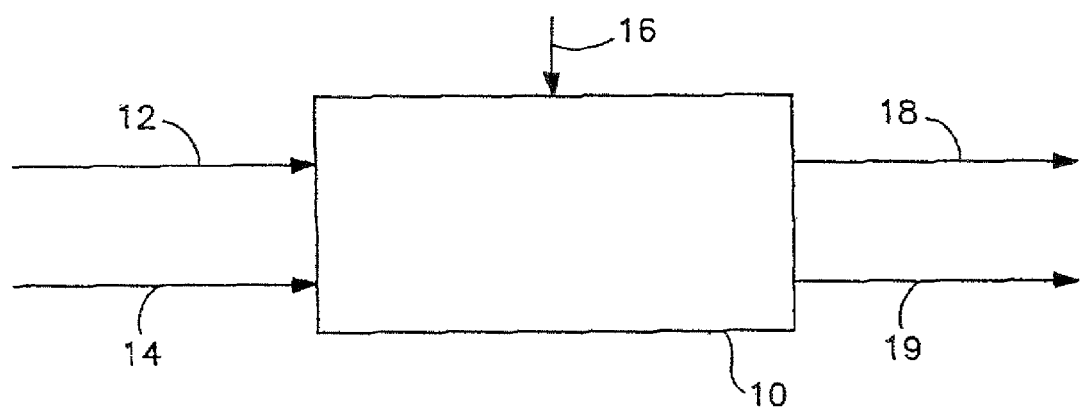
FIG. 1 illustrates one embodiment for manufacturing catalytic adsorbents in accordance with the present invention.

The present invention provides catalytic adsorbents suitable for use in the removal of mercury from flue gas streams at elevated temperatures. The catalytic adsorbents of the present invention include compositions having an activated carbon with a halogen or a halide salt or other halide compound dispersed on the activated carbon. The cation of the halide salt dopant can be an alkaline, alkaline earth, or transition metal while the anion can be bromide or chloride. The adsorbents also exhibit, following use in adsorbing mercury from flue gas, a Foaming Index less than 45.

The present invention also provides methods of using these compositions for mercury capture at elevated temperature in the presence of acidic gases and/or oxidative gases that are commonly found in flue gas streams generated by coal burning.

The mercury capture action is a synergistic combination of components in the adsorbent compositions, the flue gas stream as well as the flue gas stream temperature. As described in U.S. Published Patent Application No. 2006/0204418A1, activated carbon by itself at 270° F. does not adsorb mercury in a nitrogen stream. KBr doped silica gel does not adsorb an appreciable amount of mercury, even in the presence of full flue gas. KBr doped graphite does not adsorb mercury at all. Bromide salt doped activated carbons, however, are particularly efficient adsorbents in flue gases as they can remove mercury to extremely low levels. In addition, they are able to remove some mercury in a nitrogen stream.

As discussed herein, alkaline, alkaline earth and transition metal halides are harmless salts and inert to mercury and activated carbon at room temperature. At about 200°-570° F. (e.g., 270° F.), however, and in the presence of acidic gases and/or oxidative gases of flue gas, these doped activated carbon compositions are capable of capturing mercury with high efficiency. Unused halide salts remain in their salt form.

The catalytic adsorbents of the present invention besides not interfering with the use of fly ashes in cement, also perform well in flue gas streams generated by burning low chloride coal (e.g., Powder River Basin (PRB) coal from Wyoming) where current adsorbents such as Norit FGD carbon do not function efficiently.

The present invention thus provides (in part) for halogen and halides to be dispersed on activated carbon such that they retain their chemical inertness at room temperature, but react with mercury in hot flue gas to yield non volatile mercury halide. More particularly, at temperatures in the range of about 200°-570° F., and in the presence of acidic and/or oxidative gas from the flue gas, the halogen and halide react with mercury and assist the adsorbent to capture the mercury, which is present in very low concentrations in flue gas streams. The catalytic adsorbents of the present invention utilize the very fast kinetics at elevated temperatures to optimize both physical adsorption as well as chemical adsorption. The reactivity of the halide salts as used herein is thus a cooperative phenomenon.

As discussed hereinbelow, the catalytic adsorbents of the present invention having the ability to adsorb mercury and having the low Foaming Index below 45 can be made from a variety of starting materials.

The adsorbents can be made from powdered activated carbon (PAC) including PAC that contains halogen components or from raw carbonaceous material. Exemplary PACs suitable for use in the invention include, but are not limited to, FGD (available from Norit America, Inc.), ashless activated carbon powder made from purified petroleum coke and carbon fiber powder made by carbonization of rayon fiber. It will be appreciated that other activated carbons can also be used in the present invention.

The catalytic adsorbents of the present invention can be made by various methods. In one embodiment of the invention, the adsorbents can be manufactured by soaking activated carbon in an aqueous solution containing one or more halide salts and containing one or more compounds of formula Ia and/or Ib, followed by heating to promote binding of multivalent cations in the adsorbent with the one or more compounds of formula Ia and/or Ib. This approach is an economical and safe process relative to treating activated carbon with hydrogen halides or halogen gases.

In this embodiment, the minimum amount of water necessary to make a solution of the halide salt is preferably utilized. The cation of the halide salt dopant can be an alkaline, alkaline earth, or transition metal. The anion involved can be bromide or chloride. Suitable salts for use in the invention therefore include, but are not limited to, $NaCl$, $CaCl_2$, $CuCl_2$, $CuBr_2$, $NaBr$, $KBr$, $CaBr_2$ and $MgBr_2$. In some embodiments, $KBr$, $NaBr$ or $CaBr_2$ may be preferred and in some embodiments, $NaBr$ or $KBr$ may be the most preferred salt.

The PAC, preferably in powder form, and the one or more compounds of formula Ia and/or Ib, are placed in the aqueous halide salt solution and the mixture is stirred until it becomes a homogeneous slurry and such that there is sufficient contact time between the salt solution and PAC that the salt solution (including the one or more compounds of formula Ia and/or Ib) becomes dispersed on the PAC. It will be appreciated by those skilled in the art that the PAC has porosity such that the solution and hence the halide salt and one or more compounds of formula Ia and/or Ib will disperse into the PAC.

In this approach, the amount of salt necessary for the aqueous solution is determined based on the amount of PAC and the ratio of the salt to PAC that is desired for a particular adsorbent (i.e., the salt dopant level in the desired PAC determines the concentration of the salt solution). In some embodiments, the ratio of the halide salt dopant level to that of the PAC is 1:10,000 to 30:100. In more preferred embodiments, the ratio of dopant to PAC is 1:4000 to 10:100 and in most preferred embodiments, the ratio of dopant to PAC is 0.1:100 to 7:100.

The salt solution containing the PAC and the one or more compounds of formula Ia and/or Ib is allowed to soak and then allowed to sufficiently dry such that the PAC is free flowing. After the PAC is dried, it is in powder form. It should then be heated to promote binding of multivalent cations in the adsorbent material by the one or more compounds of formula Ia and/or Ib.

The material produced in this particular method may be ground to an appropriate desired particle size. While not to be construed as limiting, the PAC may pass through a 200 mesh screen. In this manner, the PAC can be used for mercury removal as less than or equal to a 200 mesh material. It will be appreciated by those skilled in the art that the adsorbent can be treated to attain an appropriate size depending on the intended use of the adsorbent. For example, smaller particle sizes (e.g., 400 mesh) may be desirable in some applications.

It is believed that the catalytic adsorbents of the present invention will perform well for mercury removal from flue gas streams at elevated temperatures given the dispersed salts on the surface of the PAC. While not intending to be bound by any theory, it is believed that the salt is inert with respect to elemental mercury at room and high (i.e. in the range of combustion zone) temperatures. At elevated temperatures of about 200-570F (for example, at about 270-300F), however, and in the presence of oxidative and/or acidic gases in the flue gas, and the doped activated carbon, mercury in the flue gas stream can be oxidized and effectively removed therefrom.

An alternative method to soaking a PAC in an aqueous solution as described above is to spray water droplets containing the desired halide salt and one or more compounds of formula Ia and/or Ib onto the PAC in a manner such that the halide salt and one or more compounds of formula Ia and/or Ib become dispersed as discussed above. Such an approach can be used in connection with the activated char produced as disclosed in Published U.S. patent application Ser. No. 11/078,517, Publication No. 2006/0204429A1, of Bool et al., filed on Mar. 14, 2005 and Published U.S. patent application Ser. No. 11/224,590, Publication No. 2006/0204430A1, of Bool et al., both entitled "Production of Activated Char Using Hot Gas", both of which are incorporated herein in their entirety by reference.

An alternative method for manufacturing catalytic adsorbents suitable for use in the present invention is shown in FIG. 1. In this embodiment, the catalytic adsorbents can be manufactured from any of various starting materials, such as by prepulverized carbonaceous feedstock presoaked in an aqueous solution containing an alkaline, alkaline earth or transition halide salt and one or more compounds of formula Ia and/or Ib. Alternatively, the prepulverized carbonaceous feedstock may have been soaked in an alcohol (e.g., ethanol) solution containing the alkaline, alkaline earth or transition halide salt and one or more compounds of formula Ia and/or Ib. The presoaked feedstock in then exposed to an oxidizing gas mixture such as air and steam at an elevated temperature in a reaction chamber to produce catalytic adsorbents and an exhaust gas. The elevated temperature also promotes binding of multivalent cations in the adsorbent with the one or more compounds of formula Ia and/or Ib.

Catalytic adsorbents prepared directly from carbonaceous feedstock can provide significant cost savings relative to processes which first make activated carbon, then dope the activated carbon to manufacture the catalytic adsorbent. Thus, instead of presoaking, the catalytic adsorbents can also be manufactured by dry mixing alkaline, alkaline earth or transitional metal halide salt powder and one or more compounds of formula Ia and/or Ib with prepulverized carbonaceous feedstock. The mixing action is desirably thorough, i.e. as close to molecular mixing as possible. For example, mixers such as multivector fluidization technology of NLI Alfr. Andersoen a.s. or plow mixer with shear action by Scott Equipment Co. can be used to accomplish sufficient mixing. In bench top levels, at very small scale, mixing was achieved by grinding with mortar and pestle.

The dry mixed feedstock is then exposed to an activating gas mixture containing components such as air, steam, $O_2$, $N_2$, $H_2O$, $CO_2$, CO or mixtures thereof at an elevated temperature such as 1200-2000° F. in a reaction chamber to produce catalytic adsorbents and an exhaust gas. The activation gas mixture can be highly oxidative or highly reducing or any level of oxidative or reducing strength in between. The chemical composition of carbonaceous materials determines the requirement on oxidation power of the activation gas mixture, which in turn determines the composition of the activating gas mixture. For example, high grade (high carbon content) coal may need a mixture of high oxidative power to provide active surface. For lignite or other high oxygen content carbonaceous material, low oxidative power gas is needed to provide high yield of activated carbon product.

Dry doping can also further simplify the manufacturing process for catalytic adsorbents of the present invention. It is preferred because it eliminates the drying step in preparing doped carbonaceous feedstock for activation.

The final concentration of the halide salt and the one or more compounds of formula Ia and/or Ib in preparing the catalytic adsorbent is determined as for the method described above (i.e. the ratio of the halide salt dopant to activated carbon is predetermined in order to determine the concentration of the salt solution, and the amount of the one or more compounds of formula Ia and/or Ib are based on the amount of multivalent cations present in the material that may need to be bound so as not to interfere with the surfactancy of air-entraining additives), except that in this embodiment, the loss of weight of carbonaceous materials due to combustion in the reaction chamber must be taken into account. One can therefore determine the concentration based on the yield of the final product to account for the weight loss due to activation.

While the halide salts are essential for sufficient mercury removal, excess halide salt may not be desirable and incurs additional cost of manufacture. It has been found that very good catalytic adsorbents of the present invention can be made with halide salt to coal ratio of about 1:1000 (by weight).

As illustrated in FIG. 1, carbonaceous feedstock 16 is injected into reaction chamber 10. The carbonaceous feedstock 16 is not yet activated and can be selected from various types of feedstock such as coal or biomass materials. While not to be construed as limiting, coals suitable for use in the present invention include, but are not limited to, lignite, sub-bituminous coal, bituminous coal or anthracite. The feedstock can be prepulverized to an appropriate size, for example from about 5-200 microns.

The carbonaceous feedstock 16 can be premixed by dry mixing, or presoaked, with a solution containing the desired halide salt and one or more compounds of formulas Ia and/or Ib as discussed above prior to injection into reaction chamber 10, or can be injected into reaction chamber 10 together with a solution containing the desired halide salt and one or more compounds of formulas Ia and/or Ib. In the presoaking embodiment, the solution can be formed from water or ethanol, although water may be preferred.

Activating gases 12 and 14 (e.g., air 12 and steam 14) are injected into reaction chamber 10 simultaneously with or nearly simultaneously with carbonaceous feedstock 16. Preferably, the steam is preheated and is injected at a temperature of about 1800° F. Some of the feedstock (such as lignite) is more reactive to oxygen, so to improve activated carbon yield, activating gases could also be steam and/or nitrogen only. At very high temperatures such as 2000° F., water is able to react with carbon and become an oxygen source for the surface of the activated carbon. Activating gas can also include a mixture of $O_2$, $N_2$, $H_2O$, $CO_2$, CO and the composition of the mixture can be used to adjust the redox power of the gas mixture to satisfy the requirements of the feedstock. Here too, the temperature achieved with the activating gas must provide sufficient heat to promote binding of multivalent cations in the adsorbent material with the one or more compounds of formula Ia and/or Ib.

Reaction chamber 10 may be selected from a variety of reactors such as single batch reactors where the feedstock is fluidized or in layers (such as being suspended on a filter media) and reactant gases pass through the feedstock (e.g., a tube furnace), or such as continuous reactors wherein the gas temperature, composition and feedstock residence time can be controlled for optimal conditions (e.g., a fluidized bed reactor). The feedstock can be fluidized by activating gas or a fluidizing device such as a Plow Mixer, available from Scott Equipment Company (for continuous processing).

Heat for reaction chamber 10 can be provided from various sources. For example, the reaction chamber can be electrically heated or heated by a flame. Alternatively or in addition to such heat, reaction chamber 10 may be heated from the heat of reaction between the feedstock and air. It will be appreciated by those skilled in the art that the desired temperature within the reaction chamber depends on several factors, including the stoichiometric ratio of oxygen or oxidizing gases to feedstock, contact time and reactivity of the feedstock. The heat may be provided from any source so long as it is sufficient to generate flue gas 18 and adsorbent 19. Typically, the temperature within the furnace will be between about 1450-2700° F., and more preferably between about 1650-2200° F. When the stoichiometric ratio of oxygen to feedstock is greater than one, the contact time between the oxidizing gas and the feedstock becomes more significant because more of the feedstock potentially can be consumed and therefore impact product yield. When the stoichiometric ratio is less than one, the contact time will be less critical.

The residence time of the carbonaceous feedstock 16 and reactive activating gases (such as air 12 and steam 14) within reaction chamber 10 is long enough such that flue gas 18 and adsorbent 19 are generated within chamber 10. The residence time of the carbon is independent of the gas and can be independently controlled. This can be significant because sufficient time is necessary to devolatilize and partially oxidize the feedstock. While the residence time is short, it is important that it be long enough to adequately activate the carbon. In some embodiments, the residence time may be on the order of minutes, but it can also be as short as milliseconds. It will be appreciated that if the residence time is too long or there is too much oxygen or steam, adsorbent yield will be negatively impacted.

Adsorbent 19 is removed from reaction chamber 10 and is ready for use as a mercury removal adsorbent from flue gas streams at elevated temperatures. Flue gas 18 typically includes combustion gases such as $CO_2$, CO, $N_2$ and $H_2O$. Any unreacted, partially combusted (e.g., CO) or volatile gases in gas stream 18 can be further combusted.

Yet another alternative embodiment for manufacturing catalytic adsorbents for use in accordance with the present invention can be found in Published U.S. Patent Application 2006/0204429, Ser. No. 11/078,517, of Bool et al., and Published U.S. patent application Ser. No. 11/224,590, Publication No. 2006/0204430, of Bool et al., both entitled "Production of Activated Char Using Hot Gas", both of which are incorporated herein in their entirety by reference. In this embodiment, the feedstock is presoaked with an aqueous or ethanol solution containing halide salt and one or more compounds of formula Ia and/or Ib as discussed above. The presoaked feedstock is then treated to produce activated char as disclosed in those published applications. The heat that is applied to the starting materials promotes the desired binding of multivalent cations in the materials with the one or more compounds of formula Ia and/or Ib.

Catalytic adsorbents of the present invention can also be formed by steps beginning with dry mixing a prepulverized raw carbonaceous material with a halide salt powder and one or more compounds of formula Ia and/or Ib. In this embodiment, the raw carbonaceous material, halide salt powder and one or more compounds of formula Ia and/or Ib are mixed together in dry form. The mixture can then be heat-treated by the methods disclosed in the aforementioned published patent applications. The temperature within the reaction zone will be at or above the melting point of the halide salt such that the halide salt melts and wets the surface of the carbonaceous material, so that the halide salt becomes dispersed in the carbonaceous material. The heat also promotes the binding of multivalent cations in the materials with the one or more compounds of formula Ia and/or Ib.

Adsorbents with which the present invention may be practiced can also be made from halogen that is provided in the form $X_2$ or HX wherein X is bromine, chlorine or iodine, and is preferably bromine. Useful methods for preparing adsorbents from $X_2$ or HX are described in Nelson Jr.'s U.S. Pat. No. 6,953,494. The product made from $X_2$ or HX with Nelson's method or other methods can be mixed with one or more compounds of formula Ia and/or Ib then followed by heat treatment to make it compatible with the surfactancy of AEA compounds. The carbonaceous material such as PAC and gaseous $X_2$ or HX are contacted with each other for the adsorbent composition to form quickly. Any common mixing method and equipment can be used to contact the gaseous $X_2$ or HX with the carbonaceous material. Preferably the mixing of the halogen-containing gas and the carbonaceous material is done at an elevated temperature. This keeps the halogen-containing gas such as bromine in the gaseous form, and minimizes the amount of any halogen being only physically adsorbed onto the carbon. Halogen that is only physically adsorbed and not chemically bound to the carbon lattice can be emitted in handling, in storage, and especially, upon injection into hot flue gas.

Any of the types of carbonaceous material described herein can be reacted with the halogen $X_2$ or HX to prepare the adsorbent compositions.

A preferred carbonaceous starting material is activated carbon. If the manufacturing process of this invention is integrated into the manufacture of the activated carbon material itself, the carbonaceous substrate could be, for example, the carbon material after it has undergone a steam activation procedure. Alternately, the activated carbon can be an existing commercial product such as those described above. Preferably the activated carbon is in a very fine state, which allows for a more uniform halogenation later in the process. An example would be a powdered activated carbon (PAC).

If the carbonaceous material begins at ambient temperature, preferably it is preheated to a temperature of above about 100° C., to drive off any physically-adsorbed moisture from the carbonaceous substrate which blocks the material's pores and will interfere with the halogenation step. The halogen is provided as $X_2$ or HX, in a 100% pure stream or mixed with other substances that are inert to the halogenation reaction. Preferably this gas comprises $Br_2$ and/or HBr. The contacting of the halogen-containing gas and the carbonaceous solids can be done at any advantageous pressure, including atmospheric pressure.

The carbonaceous materials will both physically adsorb the halogen species and chemically react with them. It is preferable to minimize the amount of halogen that is physically adsorbed weakly on the carbonaceous material. Halogen that is only physically adsorbed is prone to desorb from the composition upon changed conditions, such as injection into a hotter gas stream, for example. It is desirable to have the halogen as stable as possible on the carbon, yet in a form that is still reactive towards mercury. By exposing the carbon to the bromine or other halogen at an elevated temperature, less of the halogen species will volatilize off from the adsorbent composition during transport, storage and injection into the hot flue gas.

Any level of halogenation of the carbonaceous material appears to increase the mercury-removal performance. While over 30 wt % of $Br_2$ has been reported as being adsorbed into some powdered activated carbons, for example, significant increases in mercury reactivity are reportedly observed with only about 1 wt % $Br_2$ in the PAC. Greater degrees of bromination do correlate with greater maximum mercury capacities for a particular carbonaceous substrate. The halogenation step can be carried out in any of a number of possible reactors familiar in this field, as described by Nelson, Jr. Optionally but preferably, the adsorbent is then treated to strip off any weakly-held halogen species from the adsorbents. This can be accomplished by numerous methods, including by applying vacuum to the vessel holding the materials, by purging the vessel with air or an inert gas, by heating the adsorbents to a temperature above that of the halogenation, or by a combination of these methods.

In all of the methods for making the adsorbents that include addition of one or more compounds of formula Ia and/or Ib, the one or more compounds of formula Ia and/or Ib should be added to provide that the amount present (taking into account amounts of formula Ia and Ib that are already present) is sufficient to bind multivalent cations present in the adsorbent that would otherwise be available to interfere with the surfactancy of air-entraining additives added to cement compositions that contain fly ash which, as recovered from flue gas, contains adsorbent after its use to remove mercury from the flue gas. Generally, then, the one or more compounds of formula Ia and/or Ib should be present as 0.001 wt. % to 20 wt. % of the weight of the activated carbon. Also, it is preferred to disperse the compound(s) of formulas Ia and/or Ib throughout the composition, to help promote a greater degree of binding of the compound(s) with multivalent cations.

Generally, to achieve desired binding of multivalent cations in the adsorbent material with the one or more compounds of formula Ia and/or Ib present, in any of these methods of making the adsorbent, the material should be heated to a temperature in the order of 400° C. to 1300° C. for 0.001 sec to 1 hr. The appropriate temperature and duration of heating vary with different starting materials, but the appropriate levels can readily be determined experimentally.

The heat treatment that is applied in these methods of making the adsorbent, whenever applied, promotes the binding of multivalent cations in the material with the one or more compounds of formula Ia and/or Ib that are present in the materials. That binding may include reaction to form compounds in which multivalent cations such as calcium replace the (Alk) in formula Ib. A small amount of multivalent cations can be practically entrapped in the added material and therefore unable to interact with surfactant molecules. Binding of multivalent cations in the adsorbent can also include physical encapsulation of multivalent cation-bearing compounds in the adsorbent material so that the multivalent cations in those compounds would not be able to interact with surfactants and other air-entraining additives.

In some cases, solid adsorbents in accordance with the present invention can also be provided without the addition of any additional amounts of compounds of formula Ia and/or Ib. These are cases in which the carbonaceous feedstock (such as certain coals) from which the adsorbent is prepared already has a sufficiently high content of one or more compounds of formula Ia and/or Ib that sufficient binding of multivalent cations in the adsorbent materials to reduce or eliminate interference with surfactancy of air-entraining additives can be achieved by heating the carbonaceous feedstock under conditions effective to promote that binding. In these cases, any of the methods described above can be carried out for making the adsorbent with the halide salt or other form of halogen dispersed on carbonaceous material, with the exception that no additional amounts of one or more compounds of formulas Ia and/or Ib are added. The heating that is applied as described for each of the methods described above is still applied, either after the halide salt or other form of halogen is applied to the carbonaceous feedstock or during the course of the preparation of the adsorbent, as the case may be.

The heating must be effective to promote binding of multivalent cations in the materials from which the adsorbent is made, with the one or more compounds of formula Ia and/or Ib that in these cases are already present in the materials (typically, they are present as relatively high amounts of sodium silicate (orthosilicate). However, in these cases care must be taken to provide heating that both promotes that binding and also produces the adsorbent from the carbonaceous starting material. Simply treating the starting materials as previously taught to produce the adsorbent with the halogen or halide dispersed on it may not be effective to promote the desired binding described herein, and vice versa. The heating conditions that achieve both objectives can readily be determined with any particular set of starting materials, but are not inherent in the production of the adsorbent using previously published guidance without regard or recognition for the objective of binding multivalent cations in the adsorbent materials with compounds of formula Ia and/or Ib.

Figure 2:
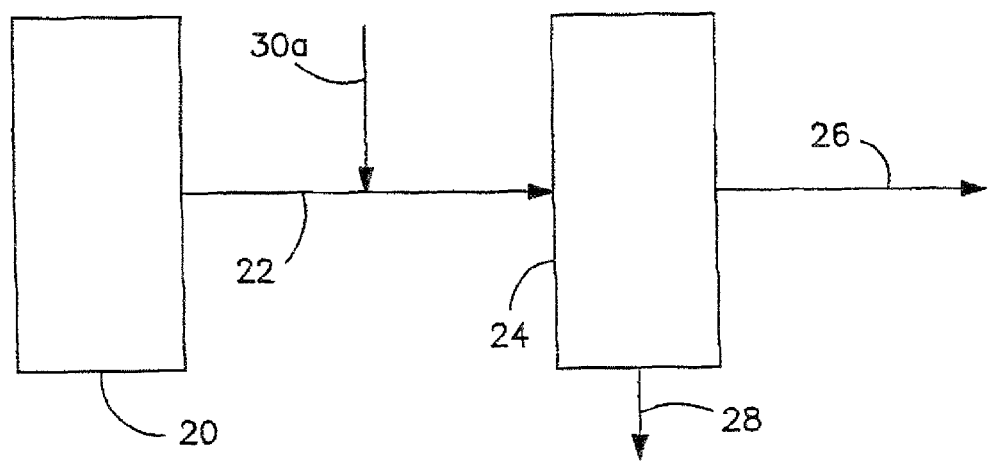
FIG. 2 illustrates a method of using the catalytic adsorbents in accordance with the present invention.

Referring now to FIG. 2, an exemplary system for using the catalytic adsorbents of the present invention is shown. Flue gas 22 is formed as a result of combustion in a furnace or boiler 20. While flue gas 22 can vary in composition and temperature, a model composition can include: 6% $O_2$, 12% $CO_2$, 8% $H_2O$, 1600 ppm $SO_2$, 400 ppm NO, 50 ppm HCl, 20 ppm $NO_2$, and 12 µg/m$^3$ elemental Hg and after going through various heat exchangers, before discharge into air, it can be in the temperature range of about 200-570° F. Catalytic adsorbent 30a, which can be formed from any of the methods described hereinabove, can be injected upstream of particulate collection device (PCD) 24. Particulate collection device 24 is typically a baghouse or electrostatic precipitators (ESPs). Adsorbent 30a is injected into flue gas stream 22 upstream of PCD 24 such that there is sufficient residence time for the catalytic adsorbent to capture and remove mercury from flue gas 22.

Particulates and adsorbent containing mercury are removed from PCD 24 by stream 28. Flue gas 26 thus contains less mercury than flue gas 22 and may be sent to the stack. In some embodiments, it may be desirable to inject the catalytic adsorbent into the flue gas downstream of the PCD.

As discussed above, it is believed that the catalytic adsorbents of the present invention will perform well for mercury removal from flue gas streams at elevated temperatures given the dispersed salts on the surface of the PAC.

EXAMPLES

Coals from three geological locations were used as starting materials to illustrate the present invention. They are: subbituminous coal from the Powder River Basin of Wyoming ("PRB"), lignite from Antelope Valley, N. Dak. ("NDL") and bituminous coal from Deer Creek, outside of Huntington, Utah) ("Utah"). The Si and Ca contents of these coals (as received, prior to any combustion or other heat treatment) are given in Table 1.

TABLE 1

Silicon and Calcium Content of Coals

| Sample Name | Si mmol/gm | Ca mmol/gm | Si/Ca |
|---|---|---|---|
| Wyoming Powder River Basin Coal (PRB) | 0.13 | 0.25 | 0.51 |
| North Dakota Antelope Valley Lignite (NDL) | 0.16 | 0.28 | 0.57 |
| Utah Deer Creek(Utah) | 0.47 | 0.21 | 2.27 |

Adsorbents of two different formulations were made from each of these coals. In one formulation, during the manufacture of the adsorbent NaBr was added as an additive (to give mercury removal capability), but no compound of formula Ia and/or Ib was added. In the other formulation, during the manufacture of the adsorbent NaBr and silica or aluminate were both added. The additives, the amounts of the additives added in the manufacture of the adsorbents, and the activation conditions used in the manufacture of the adsorbents, are set forth in Table 3, 4 and 5. The very severe activation conditions of coal were avoided to prevent the destruction of activated carbon. For the PRB and NDL coals, the addition of 0.2 wt. % sodium silicate made a significant difference in AEA compatibility (as determined by the measured Foaming Index (FI) of the resulting adsorbent). For instance, the addition of 0.2 wt. % sodium silicate reduced the FI by a factor of more than 2 or 3. The results obtained are particularly important with respect to the PRB coal, because it has the lowest Si/Ca ratio (1.4) of the materials tested. These results showed that AEA compatible adsorbents having good mercury removal capability can be manufactured by adding silicates or clay to the coal before activation. The NDL lignite also benefited from silicate addition in the manufacture of the adsorbents, but is less dependent on it. The Utah coal is least dependent on silicate for good compatibility with AEA, evidently because it is highest in native silicate content of the materials tested.

Another embodiment of the present invention was tested, to determine that activation conditions are applicable to Lignite coals of medium to high Si/Ca ratio to make AEA compatible adsorbents without the addition of additives of formulas Ia and/or Ib.

The results demonstrated that adsorbents having good mercury adsorbent capability and satisfactory AEA compatibility (i.e. low Foaming Index) can be achieved with mild activation conditions such as moderate activation temperature and short activation time, whereas the AEA compatibility can be lost if prepared under high activation temperature and long activation time or under a steam rich condition. For example an activation procedure carried out at 900° C. for 10 minutes may produce an AEA compatible adsorbent but carried out at 1000° C. for 20 minutes may destroy the AEA compatibility. Such constraints on activation conditions sometimes have adverse consequence on the quality of activated carbon such as surface area. Under such circumstance, the addition of compounds of formula Ia and/or Ib provides extra flexibility for activation process conditions.

The results showed that the Utah bituminous coal contained in its native condition sufficient silicate that it did not need to have additional silicate added to it in order for heat treatment of this material to produce an adsorbent having satisfactory mercury adsorbent capability as well as satisfactory AEA compatibility (i.e. low Foaming Index).

The adsorbents were prepared, from samples of the coals described herein and in Table 1, by the following methods. The coal, pulverized to the extent customary for use in power plants (70% passing 200 mesh and less than 1% larger than 50 mesh), was soaked with a minimum volume of a mixed aqueous solution of sodium silicate and sodium bromide, then dried and re-pulverized or (where dry mixing is indicated in the following tables) a mixture of solids was ground or mixed together until a homogenous mixture was obtained. In either case, the ratio of Na silicate:NaBr:Coal was 0.02-10:0.02-10:100). Twelve grams of the mixture obtained by one of these methods was loaded into a ceramic boat and the boat was loaded into a 2" diameter tube furnace which was maintained at the activation temperature (900° C. to 1200° C.) and constantly purged with an air stream saturated with steam at 100° C. (or as shown). The coals were activated for various lengths of time, and then the hot sample was moved into a rapid cooling zone of the tube furnace and the purge stream was changed to dry nitrogen. The activated carbon adsorbent thus produced was broken up into powder and its Foaming Index was determined.

For reference, the Foaming Index of the cement alone (Quikrete commercial grade type I/II) was found to be 5 (5 drops of 10% DarexII, 53 drops/ml), and the Foaming Index of a mixture of this cement and fly ash from P4 is 9. The Foaming Index of a mixture of the cement and a fly ash sample containing 16% residual carbon was found to be 120.

To replicate the relative amounts in actual commercial-scale use, wherein generally 1-3% mercury adsorbent would be desirable in the fly ash, 0.02 gm of activated carbon adsorbent prepared as described herein was diluted with 1.98 gm of fly ash from P-4 and the Foaming Index of the mixture was determined. The Foaming Index of commercial PACs (DARCO Hg, DARCO LH, Norit FGD, Carbon Source ACF1300/200 (Activated Carbon Fiber), and Pitch based BAC) was also determined. These reference Foaming Index values are given in Table 2. The carbon fiber had a surface area of 1400 m$^2$/gm. The Darco Hg-LH had a surface area of 429 m$^2$/gm, yet the Foaming Index of the Darco Hg-LH was 100% higher than the Foaming Index of the carbon fiber. Darco Hg-LH, Darco Hg, and FGD are all coal-based activated carbon and may have an ash content on the order of 25%.

The test conditions and results of tests using PRB coal are summarized in Table 3. Examples 1-4 show that the Foaming Index can be reduced from 88 to 43 (37) by either reducing activation temperature from 1000° C. to 900° C. or reducing activation time from 20 minutes to 10 minutes. Such improvement is useful, though not maximal. Examples 5-6 show that simply doping activated carbon with sodium silicate provides an unacceptably high Foaming Index and so would be expected to do little good in improving concrete compatibility. Examples 7-12 show that doping with sodium silicate, Cab-O-Sil, Boehmite, or bentonite clay and treated under proper activation conditions, can reduce the Foaming Index of the resulting activated carbon adsorbent to 23-24.

TABLE 2

Foaming Index of Reference Samples

| FI Testing Mixture | Average FI | Average FI in cc |
|---|---|---|
| Cement only | 5 | 0.09 |
| Cement + P4 ash | 9 | 0.17 |
| Cement + High C ash | 120 | 2.26 |
| Cement + P4 + FGD | 58 | 1.10 |
| Cement + P4 + DarcoHg-LH | 49 | 0.92 |
| Cement + P4 + DarcoHg | 38 | 0.72 |
| Cement + P4 + Carbon Fiber | 25 | 0.47 |
| Cement + P4 + Ashless Carbon | 27 | 0.51 |

TABLE 3

PRB Examples

| Ex. # | Formulation | Activation conditions of coal | FI | FI in ml |
|---|---|---|---|---|
| 1 | PRB:NaBr = 100:0.2 | 1000 C. Air 2 liter/min. steam at 100 C. 20 min. | 88 | 1.66 |
| 2 | PRB:NaBr = 100:0.2 | 900 C. air 2 liter/min. steam at 100 C. 20 min. | 43 | 0.81 |
| 3 | PRB:NaBr = 100:0.2 | 1070 C. air 2 liter/min. steam 10 min. | 37 | 0.70 |
| 4 | PRB:NaBr = 100:0.1 | 1070 C. air 4 liter/min. steam 10 min. | 43 | 0.81 |
| 5 | PRB:NaBr = 100:0.2 | 1000 C. N$_2$ 2 liter/min. steam at 100 C. 30 min. | 82 | 1.55 |
| 6 | 17390-93H + 1% Nasilicate wet doping | air dry; no high temp. treatment | 70 | 1.32 |
| 7 | PRB:NaBr:sodium Silicate = 100:0.2:5 | 1070 C. air 2 liter/min. steam | 23 | 0.43 |
| 8 | PRB:NaBr:sodium Silicate = 100:0.2:1 | 1070 C. air 2 liter/min. steam 10 min. | 24 | 0.45 |
| 9 | PRB:NaBr:sodium Silicate = 100:0.2:0.1 | 1070 C. air 2 liter/min. steam 10 min. | 23 | 0.43 |
| 10 | PRB:NaBr:Cab-O-Sil = 100:0.2:2 | 1070 C. furnace temp; 4 liter/min. air through boiling water; 10 min | 24 | 0.45 |
| 11 | PRB:NaBr:Boehmite = 100:0.2:0.2 | 1070 C. air 2 liter/min. steam, 10 min. | 28 | 0.53 |
| 12 | PRB:NaBr:Wyo-ben = 100:0.2:2 | 1070 C. furnace temp; 2 liter/min. air through boiling water; 10 min | 23 | 0.43 |

The test conditions and results of tests using NDL coal are summarized in Table 4. Examples 13-14 show that sodium silicate doping can improve FI. However, lignite has higher oxygen content, and a different set of chemical properties from Sub-bituminous coal such as PRB. The AEA compatibility of adsorbent derived from NDL can be controlled relatively easily by adjusting activation conditions. Example 15 shows better FI improvement can be achieved by eliminating steam from the activation stream. Examples 16-17 show that very good FI of 15 can be achieved by simultaneously lower activation temperature and shortened activation time.

Whereas in making mercury adsorbents the goals include having high adsorption capacity as well as fast adsorption rate for mercury, and having compatibility with AEA additives (i.e. low Foaming Index), achieving any one of these goals may demand different activation conditions depending on the chemistry of the specific coal. The results obtained herein indicate that adding the silicate gives the manufacturing process extra leeway in choosing activation conditions thus improving the ability to achieve all goals to a satisfactory degree.

TABLE 4

Examples using NDL coals

| Ex. # | Formulation | Activation conditions for coal | FI | FI in ml |
|---|---|---|---|---|
| 13 | Dry mix NaBr:NDL = 0.25:100 | 1000 C. air 2 liter/min. 100 C. steam 15 minute | 63 | 1.19 |
| 14 | NDL:NaBr:Sodium silicate = 100:0.25:1 | 1000 C. air 2 liter/min. steam 15 min. | 35 | 0.66 |
| 15 | NDL:NaBr = 100:0.25 | 1000 C. air 2 liter/min. No steam 15 minute | 25 | 0.47 |
| 16 | NDL:NaBr = 100:0.2 | 900 C. Air 2 liter/min. steam 20 min. | 42 | 0.79 |
| 17 | NDL:NaBr = 100:0.2 | 900 C. Air 2 liter/min. steam 10 min. | 15 | 0.28 |

The test conditions and results of examples using Utah bituminous coals are summarized in Table 6. The results show that because the "Utah" coal used is high in native silicate, no additional silicate needs to be added.

TABLE 5

Examples using Utah bituminous coal

| Ex. # | Formulation | Activation conditions for coal | FI | FI in ml |
|---|---|---|---|---|
| 18 | Dry mix Utah coal:NaBr = 100:0.5 | 1070 C. furnace temp; 2 liter/min. steam; 20 min | 23 | 0.43 |
| 19 | Utah:NaBr = 100:0.2 | 1000 C. Air 2 liter/min. steam 20 min. | 24 | 0.45 |
| 20 | Utah:NaBr = 100:0.2 | 900 C. Air 2 liter/min. steam 20 min. | 17 | 0.32 |

What is claimed is:

1. A method of making a composition of matter for removing mercury from a flue gas stream at elevated temperature, comprising (a) forming a mixture of carbonaceous feedstock, halide salt, and one or more compounds of formula Ia and/or Ib $$Mg(OH)_2 \qquad (Ia)$$

$$(Alk)_a(M_nO_p) \qquad (Ib)$$

wherein each occurrence of M, even in the same molecule, is silicon, aluminum or phosphorus, each occurrence of Alk, even in the same molecule, is sodium or potassium, and a, n and p are positive integers chosen so that the compound of formula Ib has no net charge, and (b) subjecting the mixture formed in step (a) to conditions effective to form an adsorbent composition comprising an activated carbon having a halide salt dispersed on the surface thereof, said conditions including the application of heat effective to promote the binding of multivalent cations in said adsorbent composition with said one or more compounds of formula Ia and/or Ib, so that said composition of matter after its use to adsorb mercury from a flue gas stream at elevated temperature has a Foaming Index less than 45.

2. A method according to claim 1 wherein said one or more compounds of formula Ia and/or Ib comprises sodium or potassium orthosilicate, metasilicate, aluminosilicate, orthophosphate, or metaphosphate.

3. A method of making a composition of matter for removing mercury from a flue gas stream at elevated temperature, comprising (a) forming a mixture of carbonaceous feedstock and halide salt, (b) subjecting the mixture formed in step (a) to conditions effective to form an adsorbent composition comprising an activated carbon having a halide salt dispersed on the surface thereof, (c) mixing the product formed in step (b) with one or more compounds of formula Ia and/or Ib $$Mg(OH)_2 \qquad (Ia)$$

$$(Alk)_a(M_nO_p) \qquad (Ib)$$

wherein each occurrence of M, even in the same molecule, is silicon, aluminum or phosphorus, each occurrence of Alk, even in the same molecule, is sodium or potassium, and a, n and p are positive integers chosen so that the compound of formula Ib has no net charge, and (d) subjecting the mixture formed in step (c) to conditions including the application of heat effective to promote the binding of multivalent cations in said adsorbent composition with said one or more compounds of formula Ia and/or Ib, so that said composition of matter after its use to adsorb mercury from a flue gas stream at elevated temperature has a Foaming Index less than 45.

4. A method according to claim 3 wherein said one or more compounds of formula Ia and/or Ib comprises sodium or potassium orthosilicate, metasilicate, aluminosilicate, orthophosphate, or metaphosphate.

5. A method of making a composition of matter for removing mercury from a flue gas stream at elevated temperature, comprising (a) forming a mixture of carbonaceous feedstock and halide salt, wherein the carbonaceous feedstock contains one or more compounds of formula Ia and/or Ib $$Mg(OH)_2 \qquad (Ia)$$

$$(Alk)_a(M_nO_p) \qquad (Ib)$$

wherein each occurrence of M, even in the same molecule, is silicon, aluminum or phosphorus, each occurrence of Alk, even in the same molecule, is sodium or potassium, and a, n and p are positive integers chosen so that the compound of formula Ib has no net charge, and (b) subjecting the mixture formed in step (a) to conditions effective to form an adsorbent composition comprising an activated carbon having a halide salt dispersed on the surface thereof, which conditions include the application of heat effective to promote the binding of multivalent cations in said adsorbent composition with said one or more compounds of formula Ia and/or Ib, so that said composition of matter after its use to adsorb mercury from a flue gas stream at elevated temperature has a Foaming Index less than 45, wherein said method is carried out without the addition of any additional amounts of any compounds of formula Ia or Ib.

6. A method according to claim 5 wherein said one or more compounds of formula Ia and/or Ib comprises sodium or potassium orthosilicate, metasilicate, aluminosilicate, orthophosphate, or metaphosphate.

7. A method of making a catalytic adsorbent for use in the adsorption of mercury from flue gas streams at elevated temperatures, comprising:
placing a powder activated carbon in an aqueous solution containing a halide salt having a cation and an anion and containing one or more compounds of formula Ia and/or Ib

$$Mg(OH)_2 \tag{Ia}$$

$$(Alk)_a(M_nO_p) \tag{Ib}$$

wherein each occurrence of M, even in the same molecule, is silicon, aluminum or phosphorus, each occurrence of Alk, even in the same molecule, is sodium or potassium, and a, n and p are positive integers chosen so that the compound of formula Ib has no net charge, to form a mixture;
stirring the mixture until a homogeneous slurry is formed;
drying the powder activated carbon such that water from the aqueous solution evaporates and the halide salt and one or more compounds of formula Ia and/or Ib are dispersed on the surface of the powder activated carbon, by applying heat effective to promote the binding of multivalent cations in said adsorbent composition with said one or more compounds of formula Ia and/or Ib, so that said composition of matter after its use to adsorb mercury from a flue gas stream at elevated temperature has a Foaming Index less than 45, wherein said method is carried out without the addition of any additional amounts of any compounds of formula Ia or Ib.

8. The method of claim 7, wherein the cation is selected from the group consisting of Na, Mg, Ca, Cu, K and combinations thereof.

9. The method of claim 7, wherein the anion is selected from the group consisting of bromide, chloride and combinations thereof.

10. A method according to claim 7 wherein said one or more compounds of formula Ia and/or Ib comprises sodium or potassium orthosilicate, metasilicate, aluminosilicate, orthophosphate, or metaphosphate.

11. A method of making a catalytic adsorbent for use in the adsorption of mercury from flue gas streams at elevated temperatures, comprising: injecting into a reaction chamber a carbonaceous feedstock presoaked with halide salt having a cation and an anion and with one or more compounds of formula Ia and/or Ib

$$Mg(OH)_2 \tag{Ia}$$

$$(Alk)_a(M_nO_p) \tag{Ib}$$

wherein each occurrence of M, even in the same molecule, is silicon, aluminum or phosphorus, each occurrence of Alk, even in the same molecule, is sodium or potassium, and a, n and p are positive integers chosen so that the compound of formula Ib has no net charge; injecting at least one oxidizing gas into the reaction chamber; injecting steam into the reaction chamber, wherein the presoaked carbonaceous feedstock, the air and the steam are injected into the reaction chamber under conditions and for a residence time sufficient to form an activated carbon having a halide salt having a cation and an anion dispersed on the surface of the activated carbon and to promote the binding of multivalent cations in said adsorbent composition with said one or more compounds of formula Ia and/or Ib, so that said composition of matter after its use to adsorb mercury from a flue gas stream at elevated temperature has a Foaming Index less than 45.

12. The method of claim 11, wherein the oxidizing gas comprises air, oxygen, steam, nitrogen or a combination thereof.

13. The method of claim 11, wherein the cation is selected from the group consisting of Na, Ca, Cu, K and combinations thereof.

14. The method of claim 11, wherein the anion is selected from the group consisting of bromide, chloride and combinations thereof.

15. A method according to claim 11 wherein said one or more compounds of formula Ia and/or Ib comprises sodium or potassium orthosilicate, metasilicate, aluminosilicate, orthophosphate, or metaphosphate.

16. A method of making a catalytic adsorbent for use in the adsorption of mercury from flue gas streams at elevated temperatures, comprising: dry mixing a carbonaceous feedstock with a halide salt and with one or more compounds of formula Ia and/or Ib

$$Mg(OH)_2 \tag{Ia}$$

$$(Alk)_a(M_nO_p) \tag{Ib}$$

wherein each occurrence of M, even in the same molecule, is silicon, aluminum or phosphorus, each occurrence of Alk, even in the same molecule, is sodium or potassium, and a, n and p are positive integers chosen so that the compound of formula Ib has no net charge; injecting the mixed carbonaceous feedstock into a reaction chamber; and injecting at least one activating gas into the reaction chamber; wherein the carbonaceous feedstock and the at least one activating gas are subjected in the reaction chamber to conditions and for a residence time sufficient to form an activated carbon having a halide salt having a cation and an anion dispersed on the surface of the activated carbon, said conditions including the application of heat effective to promote the binding of multivalent cations in said adsorbent composition with said one or more compounds of formula Ia and/or Ib, so that said composition of matter after its use to adsorb mercury from a flue gas stream at elevated temperature has a Foaming Index less than 45.

17. The method of claim 16, wherein the at least one activating gas comprises air, oxygen, steam, nitrogen, $CO_2$, CO or a combination thereof.

18. The method of claim 16, wherein the cation is selected from the group consisting of Na, Ca, Mg, Cu, K and combinations thereof.

19. The method of claim 16, wherein the anion is selected from the group consisting of bromide, chloride and combinations thereof.

20. A method according to claim 16 wherein said one or more compounds of formula Ia and/or Ib comprises sodium or potassium orthosilicate, metasilicate, aluminosilicate, orthophosphate, or metaphosphate.

21. The method of claim 16, wherein the carbonaceous feedstock comprises coal.

22. A method of making catalytic adsorbent for use in the adsorption of mercury from flue gas streams at elevated temperatures, comprising: wet mixing a carbonaceous feedstock with a halide salt and with one or more compounds of formula Ia and/or Ib $$Mg(OH)_2 \quad \text{(Ia)}$$

$$(Alk)_a(M_nO_p) \quad \text{(Ib)}$$

wherein each occurrence of M, even in the same molecule, is silicon, aluminum or phosphorus, each occurrence of Alk, even in the same molecule, is sodium or potassium, and a, n and p are positive integers chosen so that the compound of formula Ib has no net charge; drying the mixture; injecting the dried mixture into a reaction chamber; and injecting at least one activating gas into the reaction chamber;
wherein the carbonaceous feedstock and the at least one activating gas are subjected in the reaction chamber to conditions and for a residence time sufficient to form an activated carbon having a halide salt having a cation and an anion dispersed on the surface of the activated carbon, said conditions including the application of heat effective to promote the binding of multivalent cations in said adsorbent composition with said one or more compounds of formula Ia and/or Ib, so that said composition of matter after its use to adsorb mercury from a flue gas stream at elevated temperature has a Foaming Index less than 45.

23. The method of claim 22, wherein the at least one activating gas comprises air, oxygen, steam, nitrogen, $CO_2$, CO or a combination thereof.

24. The method of claim 22, wherein the cation is selected from the group consisting of Na, Ca, Mg, Cu, K and combinations thereof.

25. The method of claim 22, wherein the anion is selected from the group consisting of bromide, chloride and combinations thereof.

26. A method according to claim 22 wherein said one or more compounds of formula Ia and/or Ib comprises sodium or potassium orthosilicate, metasilicate, aluminosilicate, orthophosphate, or metaphosphate.

27. The method of claim 22, wherein the carbonaceous feedstock comprises coal.

28. A method of making a catalytic adsorbent for use in the adsorption of mercury from flue gas streams at elevated temperatures, comprising: injecting into a reaction chamber coal presoaked with halide salt having a cation and an anion, wherein the coal contains one or more compounds of formula Ia and/or Ib $$Mg(OH)_2 \quad \text{(Ia)}$$

$$(Alk)_a(M_nO_p) \quad \text{(Ib)}$$

wherein each occurrence of M, even in the same molecule, is silicon, aluminum or phosphorus, each occurrence of Alk, even in the same molecule, is sodium or potassium, and a, n and p are positive integers chosen so that the compound of formula Ib has no net charge; injecting at least one oxidizing gas into the reaction chamber; injecting steam into the reaction chamber, wherein the presoaked coal, the air and the steam are subjected in the reaction chamber to conditions and for a residence time sufficient to form an activated carbon having a halide salt having a cation and an anion dispersed on the surface of the activated carbon, said conditions including the application of heat effective to promote the binding of multivalent cations in said adsorbent composition with said one or more compounds of formula Ia and/or Ib, so that said composition of matter after its use to adsorb mercury from a flue gas stream at elevated temperature has a Foaming Index less than 45, wherein said method is carried out without the addition of any additional amounts of any compounds of formula Ia or Ib.

29. The method of claim 28, wherein the oxidizing gas comprises air, oxygen, steam, nitrogen or a combination thereof.

30. The method of claim 28, wherein the cation is selected from the group consisting of Na, Ca, Cu, K and combinations thereof.

31. The method of claim 28, wherein the anion is selected from the group consisting of bromide, chloride and combinations thereof.

32. A method according to claim 28 wherein said one or more compounds of formula Ia and/or Ib comprises sodium or potassium orthosilicate, metasilicate, aluminosilicate, orthophosphate, or metaphosphate.

33. A method of making a catalytic adsorbent for use in the adsorption of mercury from flue gas streams at elevated temperatures, comprising: dry mixing coal with a halide salt having a cation and an anion, wherein the coal contains one or more compounds of formula Ia and/or Ib $$Mg(OH)_2 \quad \text{(Ia)}$$

$$(Alk)_a(M_nO_p) \quad \text{(Ib)}$$

wherein each occurrence of M, even in the same molecule, is silicon, aluminum or phosphorus, each occurrence of Alk, even in the same molecule, is sodium or potassium, and a, n and p are positive integers chosen so that the compound of formula Ib has no net charge; injecting the mixture of coal and halide salt into a reaction chamber; and injecting at least one activating gas into the reaction chamber; wherein the coal and the at least one activating gas are subjected in the reaction chamber to conditions and for a residence time sufficient to form an activated carbon having a halide salt having a cation and an anion dispersed on the surface of the activated carbon, said conditions including the application of heat effective to promote the binding of multivalent cations in said adsorbent composition with said one or more compounds of formula Ia and/or Ib, so that said composition of matter after its use to adsorb mercury from a flue gas stream at elevated temperature has a Foaming Index less than 45, wherein said method is carried out without the addition of any additional amounts of any compounds of formula Ia or Ib.

34. The method of claim 33, wherein the at least one activating gas comprises air, oxygen, steam, nitrogen, $CO_2$, CO or a combination thereof.

35. The method of claim 33, wherein the cation is selected from the group consisting of Na, Ca, Mg, Cu, K and combinations thereof.

36. The method of claim 33, wherein the anion is selected from the group consisting of bromide, chloride and combinations thereof.

37. A method according to claim 33 wherein said one or more compounds of formula Ia and/or Ib comprises sodium or potassium orthosilicate, metasilicate, aluminosilicate, orthophosphate, or metaphosphate.

38. A method of making catalytic adsorbent for use in the adsorption of mercury from flue gas streams at elevated temperatures, comprising: wet mixing coal with a halide salt, wherein the coal contains one or more compounds of formula Ia and/or Ib $$Mg(OH)_2 \quad \text{(Ia)}$$

$$(Alk)_a(M_nO_p) \quad \text{(Ib)}$$

wherein each occurrence of M, even in the same molecule, is silicon, aluminum or phosphorus, each occurrence of Alk, even in the same molecule, is sodium or potassium, and a, n and p are positive integers chosen so that the compound of formula Ib has no net charge; drying the mixture; injecting the dried mixture into a reaction chamber; and injecting at least one activating gas into the reaction chamber; wherein the coal and the at least one activating gas are subjected in the reaction chamber to conditions and for a residence time sufficient to form an activated carbon having a halide salt having a cation and an anion dispersed on the surface of the activated carbon, said conditions including the application of heat effective to promote the binding of multivalent cations in said adsorbent composition with said one or more compounds of formula Ia and/or Ib, so that said composition of matter after its use to adsorb mercury from a flue gas stream at elevated temperature has a Foaming Index less than 45, wherein said method is carried out without the addition of any additional amounts of any compounds of formula Ia or Ib.

39. The method of claim 38, wherein the at least one activating gas comprises air, oxygen, steam, nitrogen, $CO_2$, CO or a combination thereof.

40. The method of claim 38, wherein the cation is selected from the group consisting of Na, Ca, Mg, Cu, K and combinations thereof.

41. The method of claim 38, wherein the anion is selected from the group consisting of bromide, chloride and combinations thereof.

42. A method according to claim 38 wherein said one or more compounds of formula Ia and/or Ib comprises sodium or potassium orthosilicate, metasilicate, aluminosilicate, orthophosphate, or metaphosphate.

43. A method of making a composition of matter for removing mercury from a flue gas stream at elevated temperature, comprising
   (a) contacting activated carbon with a compound of the formula $X_2$ or HX, wherein X is bromine, chlorine or iodine, under conditions effective to bond or adsorb atoms of X onto the surface of said activated carbon,
   (b) mixing the product formed in step (a) with one or more compounds of formula Ia and/or Ib $$Mg(OH)_2 \qquad (Ia)$$

$$(Alk)_a(M_nO_p) \qquad (Ib)$$

wherein each occurrence of M, even in the same molecule, is silicon, aluminum or phosphorus, each occurrence of Alk, even in the same molecule, is sodium or potassium, and a, n and p are positive integers chosen so that the compound of formula Ib has no net charge, and
   (c) subjecting the mixture formed in step (b) to conditions effective to form an adsorbent composition comprising an activated carbon having a halide salt dispersed on the surface thereof, said conditions including the application of heat effective to promote the binding of multivalent cations in said adsorbent composition with said one or more compounds of formula Ia and/or Ib, so that said composition of matter after its use to adsorb mercury from a flue gas stream at elevated temperature has a Foaming Index less than 45.

44. A method according to claim 43 wherein X is Br.

45. A method according to claim 43 wherein the compound of formula Ib is sodium silicate.

* * * * *